No. 875,279. PATENTED DEC. 31, 1907.
J. A. McCOY.
JUNCTION OR CONNECTING BOX.
APPLICATION FILED MAR. 19, 1906.
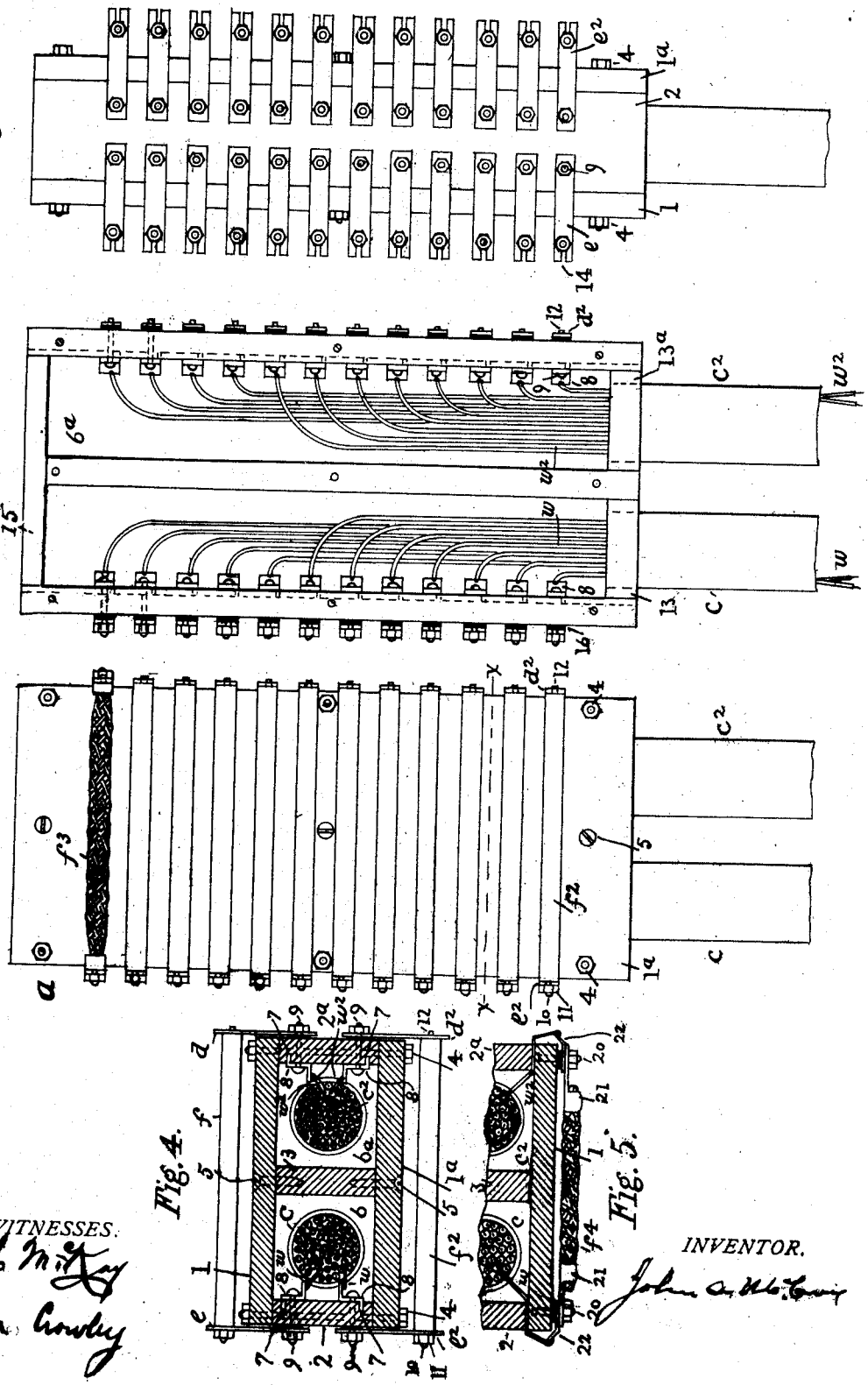
WITNESSES
INVENTOR.

UNITED STATES PATENT OFFICE.

JOHN A. McCOY, OF SOMERVILLE, MASSACHUSETTS.

JUNCTION OR CONNECTING BOX.

No. 875,279.  Specification of Letters Patent.  Patented Dec. 31, 1907.

Application filed March 19, 1906. Serial No. 306,744.

*To all whom it may concern:*

Be it known that I, JOHN A. McCOY, residing at Somerville, in the county of Middlesex and State of Massachusetts, have invented certain Improvements in Junction or Connecting Boxes, of which the following is a specification.

The present invention relates to junction or connection boxes at which a plurality of cables terminate, and in which means are provided for interconnecting the conductors of the cables.

The invention especially concerns a box adapted to connect the conductors from an underground cable with the conductors of an overhead cable through fusible wires, which box is provided with two parallel ducts or compartments, into one of which enters the end of the cable having incoming insulated conductors, and into the second of which enters the cable with outgoing insulated conductors, the two compartments being separated by a common partition. Upon the inner side of the wall of each compartment opposite the partition are one or more series of evenly spaced clips to which the conductors may be soldered and each clip extends by conductive means through the said walls and terminates in a thin resilient blade of metal on the outside of the box which extends beyond the face of the box, and between each pair of said blades which extend from the opposite sides of the box may be secured a cylindrical tube inclosing a fusible wire by means of which an incoming conductor is continued to outgoing conductor. In such boxes it is desirable that the conductors of one cable be separated from the conductors of a second cable, especially when the terminals of each cable are to be joined by a fusible wire, for when such a wire is fused it is necessary that the said terminals be widely separated.

The walls of the box are of insulating material, such for example as hard wood boiled in linseed oil to fill the pores thereof; and the said walls are secured together by bolts and screws, in order that the inclosed ducts or compartments may be waterproof; and also that the end walls may be removed when the internal connections are soldered. When the internal connections are made and the walls secured in place, the ducts or compartments may be filled with insulation while hot and liquid, as melted paraffin.

All of which I will now proceed to describe and point out in the appended claims reference being made to the accompanying drawings, in which Figure 1 is a side view of the junction or connecting box. Fig. 2 is a similar view to the preceding but with the front wall removed. Fig. 3 is an end view of the box. Fig. 4 is a section on line $x$ $x$ of Fig. 1, and Fig. 5 is a similar section showing a modification.

In the drawings $a$ represents the box as a whole and 1 and $1^a$ are the front sides, 2 and $2^a$ the ends and 3 a partition dividing the box into two parallel ducts or compartments 6 and $6^a$. The box may be made any required length, and is provided with bottom pieces 13 and $13^a$ perforated for the reception of the ends of cables $c$ and $c^2$, and a cover 15 is arranged to inclose the upper end.

In Figs. 1 to 4 inclusive the end walls 2 and $2^a$ have two narrow channels 7, 7, in their inner surfaces the whole length of the box, adapted to receive one leg of the clips 8, 8, whose opposite leg to which a conductor is soldered extends into the duct, while its central portion is perforated to receive a screw bolt 9. These clips are spaced equal distances apart and holes are bored in the end walls through which the bolts extend, preferably passing through insulating washers 16, and the metal spring pieces designated $e$ and $e^2$ on one end and $d$ and $d^2$ on the opposite end, and upon the end of each bolt is a nut to hold the several parts closely to each other. When the clips 8 are put in place I prefer to solder the head of the bolt to the clip and also solder the end of the bolt to the metal spring pieces and nuts, so that there will be a solid electrical connection from the clip to the spring. The metal springs extend beyond the faces of the sides 1 and $1^a$ and those on the left side have slits 14 in their ends, and those on the right side have holes or perforations in their ends.

Fuses $f$ and $f^2$ of the ordinary kind consisting of fusible wires inclosed in insulating tubes, having a screw 10 and nut 11 on one end and a round projection 12 on the other end are placed between opposite pairs of springs $e$ and $d$ in the same horizontal plane, the projection 12 passing through the perforation in spring $d$ and the screw 10 inclosed in the slit 14, and the nut 11 holding the fuse in place, so that electrical conduction is made from one spring to the other.

The cables $c$ and $c^2$ may be secured to the box $a$ in any suitable manner after the sheath has been cut away to leave the conductors $w$ and $w^2$ extended beyond the same, and the bare end of each pair of conductors is then soldered to the two clips 8, in the same horizontal plane. In Fig. 2 each conductor is represented as extending upward from the sheath and is supposed to have its mate immediately behind it, and to be soldered to the clip in the rear of the clip in sight as seen also in Fig. 4. It will be perceived therefore, that the pair of conductors $w^2$ of the incoming cable $c^2$, which may be the cable coming from the underground system, are soldered say to the lower clips 8, 8, in the duct $6^a$ and continue their circuit by one conductor, to the spring $d$, fuse $f$, spring $e$ and clips 8 in the duct 6 to one or the pair of conductors $w$ of the cable $c$ which may be an overhead cable and by the second conductor of the pair, forms a circuit from its clip 8, by spring $d^2$, fuse $f^2$, spring $e^2$, clip 8, to the second conductor $w$ of the pair, in cable $c$ of the overhead system.

Such a junction or connecting box as indicated herein, may be placed upon a wall or pole, in the open air, and in practice is covered by a metal can to protect it from the weather and the underground cables are brought up to the lower end of the box; the overhead cable may if desired be brought to the upper end of the box, but in any case it is necessary when the transposition is made from one system to the other, for the protection of both systems that fusible wires be interposed.

When the conductors are to be soldered to the clips the end walls 2 and $2^a$ are removed, and then replaced to be secured by the bolts 4 and the sides 1 and $1^a$ are secured to the partition 3 by the screws 5. These bolts and screws hold the parts firmly together; and when all are thus connected melted insulation as paraffin may be poured into the ducts and seal the conductors from moisture.

I may if preferable connect the conductors of each pair to the clips 8, in vertical series or plane instead of in the horizontal plane, and employ fuses on one side only of the box without departing from the invention.

The upper fuse $f^3$ in Fig. 1 is different from the other fuses in that the inclosing jacket of the fusible wire is made of braided asbestos as described in Patent No. 550,638 to A. H. McCulloch dated December 3, 1895, and is provided with metal ends which secure the asbestos tube, which ends have screws and nuts to engage the metal pieces $e$ and $d$, as does the fuse $f^2$.

Fig. 5 shows a modification in which screws 20 provided with washers and nuts are secured in the outer edges of the side 1, which screws are soldered to the metal clips 22, and the wires $w$ and $w^2$ are brought out from the cables $c$ and $c^2$ through scores cut in the edges of the end pieces 2 and $2^a$ and are soldered to said clips. An asbestos fuse $f^4$ provided with metal ends which are slitted to embrace the screws 20, is secured in place by means of the nuts on the ends of the screws. Similar screws and fuses may be provided on the opposite side of the ducts, so that a pair of conductors may be brought out from each cable in the same longitudinal plane.

I claim as my invention:

1. A junction or connection box having end walls formed with channels, clips each having one end projecting into said channel, the other ends of the clips projecting into the box for connection with conducting wires, bolts securing the clips in position, said bolts passing through the walls of the box, and outside fuses and connections between said fuses and the bolts.

2. A junction or connection box having end walls formed with channels, clips each having one end projecting into said channel and the other ends of the clips projecting into the box for connection with conducting wires, bolts securing the clips in position and passing through the wall of the box, metal springs each connected at one end with said bolts, and fuses outside the box and supported by said springs.

3. A junction or connection box having end walls formed with channels, clips each having one end projecting into said channel and the other ends of the clips projecting into the box for connection with conducting wires, bolts securing the clips in position and passing through the wall of the box, metal springs each connected at one end with said bolts, said springs being arranged in pairs, one spring of each pair having a hole near its outer end and the other spring of the pair having a slit, and fuses mounted in the holes and slits of the springs.

In testimony whereof I have signed my name to this specification in the presence of two subscribing witnesses, this sixteenth day of March, 1906.

JOHN A. McCOY.

Witnesses:
H. C. McKay,
L. M. Crowley.